US009225604B2

(12) United States Patent
Anderson et al.

(10) Patent No.: US 9,225,604 B2
(45) Date of Patent: Dec. 29, 2015

(54) MAPPING REQUIREMENTS TO A SYSTEM TOPOLOGY IN A NETWORKED COMPUTING ENVIRONMENT

(75) Inventors: Jason L. Anderson, San Jose, CA (US); Gregory J. Boss, Saginaw, MI (US); Jeffrey L. Coveyduc, San Jose, CA (US); Shaun T. Murakami, San Jose, CA (US); John Reif, Redwood City, CA (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 13/439,957

(22) Filed: Apr. 5, 2012

(65) Prior Publication Data

US 2013/0268638 A1    Oct. 10, 2013

(51) Int. Cl.
*G06F 15/177*    (2006.01)
*H04L 12/24*    (2006.01)
*H04L 12/751*    (2013.01)

(52) U.S. Cl.
CPC .............. *H04L 41/12* (2013.01); *H04L 45/02* (2013.01)

(58) Field of Classification Search
CPC ...... H04L 41/12; H04L 41/0893; H04L 45/02
USPC .................................................. 709/220, 228
See application file for complete search history.

(56) References Cited

U.S. PATENT DOCUMENTS

| | | | |
|---|---|---|---|
| 6,477,572 B1 * | 11/2002 | Elderton et al. | 709/224 |
| 6,587,440 B1 | 7/2003 | Dawes | |
| 7,000,006 B1 | 2/2006 | Chen | |
| 8,069,242 B2 | 11/2011 | Hadar et al. | |
| 2006/0080413 A1 * | 4/2006 | Oprea et al. | 709/220 |
| 2006/0123477 A1 * | 6/2006 | Raghavan et al. | 726/22 |
| 2009/0259636 A1 | 10/2009 | Labrou et al. | |
| 2009/0327903 A1 | 12/2009 | Smith et al. | |
| 2011/0106951 A1 | 5/2011 | Akiyama et al. | |
| 2011/0265168 A1 | 10/2011 | Lucovsky et al. | |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Ario Etienne
*Assistant Examiner* — Uzma Alam
(74) *Attorney, Agent, or Firm* — William E. Schiesser; Keohane & D'Alessandro PLLC; Hunter E. Webb

(57) ABSTRACT

Embodiments of the present invention provide an approach for mapping requirements (e.g., functional and/or non-functional requirements) to components and/or policies of a system topology in a networked computing environment (e.g., a cloud computing environment). In a typical embodiment, a set of functional requirements is mapped to a set of components. A set of dependencies between the set of functional requirements is then indentified so that a set of interrelationships between the set of components may be identified. A set of non-functional requirements is then mapped to a set of policies that are then applied to the set of components. Based on the set of components, the set of interrelationships, and the set of policies, a system topology is generated. Upon implementation of the system topology, runtime metrics may be collected as feedback that is utilized for refinement of the system topology, as well as a system topology deployed in the future.

22 Claims, 6 Drawing Sheets

(56) References Cited

U.S. PATENT DOCUMENTS

| | | | |
|---|---|---|---|
| 2011/0289119 A1 | 11/2011 | Hu et al. | |
| 2012/0017110 A1* | 1/2012 | Omar | 714/2 |
| 2013/0097304 A1* | 4/2013 | Asthana et al. | 709/224 |
| 2013/0322298 A1* | 12/2013 | Alexander et al. | 370/255 |
| 2014/0092726 A1* | 4/2014 | Khan et al. | 370/221 |

OTHER PUBLICATIONS

Mell et al., "The NIST Definition of Cloud Computing", National Institute of Standards and Technology, Information Technology Laboratory, Version 15, Oct. 7, 2009, 2 pages.

Battre, D. et al., "Inferring Network Topologies in Infrastructure as a Service Clouds", Proceedings of the 2011 11th IEEE/ACM International Symposium on Cluster, Cloud and Grid Computing, IEEE Computer Society, Washington, D.C. 2 pages.

"Adjust the Cloud Computing", NETARA, 3 pages. http://netara.net.id/netara-products-netara-cloud-computing/.

Maitland, J., "Keeping Control Isn't Easy", Chapter 4: Cloud-Based Infrastructure, SearchCloudComputing.com, Publication Date: Oct. 2009, 13 pages.

Battre, D. et al., "Inferring Network Topologies in Infrastructure as a Service Clouds", Proceedings of the 2011 11th IEEE/ACM International Symposium on Cluster, Cloud and Grid Computing, IEEE Computer Society, Washington, D.C., May 23-26, 2011, 2 pages.

"Adjust the Cloud Computing", Netara, 3 pages. http://netara.net.id/netara-products-netara-cloud-computing/, Apr. 4, 2012.

* cited by examiner

MAPPING REQUIREMENTS TO A SYSTEM TOPOLOGY IN A NETWORKED COMPUTING ENVIRONMENT

TECHNICAL FIELD

In general, embodiments of the present invention relate to system topology mapping. Specifically, embodiments of the present invention relate to the mapping of requirements (functional and/or non-functional requirements) to components and/or policies of a system topology in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud consumers are provided with the capability to develop and deploy complex patterns, topologies, and/or architectures. Challenges may exist, however, in automating the topology development process. For example, system topologies may be based on multiple factors, inputs, and or requirements. Currently, such items are typically utilized to generate a system topology in a manual fashion. Such an implementation may be both inefficient and costly.

SUMMARY

In general, embodiments of the present invention provide an approach for mapping requirements (e.g., functional and/or non-functional requirements) to components and/or policies of a system topology in a networked computing environment (e.g., a cloud computing environment). In a typical embodiment, a set of functional requirements is mapped to a set of components. A set of dependencies between the set of functional requirements is then indentified so that a set of interrelationships between the set of components may be identified. A set of non-functional requirements is then mapped to a set of policies that are then applied to the set of components. Based on the set of components, the set of interrelationships, and the set of policies, a system topology is generated. Upon implementation of the system topology, runtime metrics may be collected as feedback that is utilized for refinement of the system topology, as well as a system topology deployed in the future.

A first aspect of the present invention provides a computer-implemented method for mapping requirements to a system topology in a networked computing environment, comprising: mapping a set of functional requirements to a set of components of the networked computing environment; identifying a set of dependencies between the set of functional requirements; identifying a set of interrelationships between the set of components based on the set of dependencies; mapping a set of non-functional requirements to a set of policies, the set of policies being stored in at least one computer memory medium; applying the set of policies to the set of components; and generating the system topology based on the set of components, the set of interrelationships, and the set of policies.

A second aspect of the present invention provides a system for mapping requirements to a system topology in a networked computing environment, comprising: a memory medium comprising instructions; a bus coupled to the memory medium; and a processor coupled to the bus that when executing the instructions causes the system to: map a set of functional requirements to a set of components of the networked computing environment; identify a set of dependencies between the set of functional requirements; identify a set of interrelationships between the set of components based on the set of dependencies; map a set of non-functional requirements to a set of policies, the set of policies being stored in at least one computer memory medium; apply the set of policies to the set of components; and generate the system topology based on the set of components, the set of interrelationships, and the set of policies.

A third aspect of the present invention provides a computer program product for mapping requirements to a system topology in a networked computing environment, the computer program product comprising a computer readable storage media, and program instructions stored on the computer readable storage media, to: map a set of functional requirements to a set of components of the networked computing environment; identify a set of dependencies between the set of functional requirements; identify a set of interrelationships between the set of components based on the set of dependencies; map a set of non-functional requirements to a set of policies, the set of policies being stored in at least one computer memory medium; apply the set of policies to the set of components; and generate the system topology based on the set of components, the set of interrelationships, and the set of policies.

A fourth aspect of the present invention provides a method for deploying a system for mapping requirements to a system topology in a networked computing environment, comprising: providing a computer infrastructure being operable to: map a set of functional requirements to a set of components of the networked computing environment; identify a set of dependencies between the set of functional requirements; identify a set of interrelationships between the set of components based on the set of dependencies; map a set of non-functional requirements to a set of policies, the set of policies being stored in at least one computer memory medium; apply the set of policies to the set of components; and generate the system topology based on the set of components, the set of interrelationships, and the set of policies.

BRIEF DESCRIPTION OF THE DRAWINGS

These and other features of this invention will be more readily understood from the following detailed description of the various aspects of the invention taken in conjunction with the accompanying drawings in which.

Figure 1:
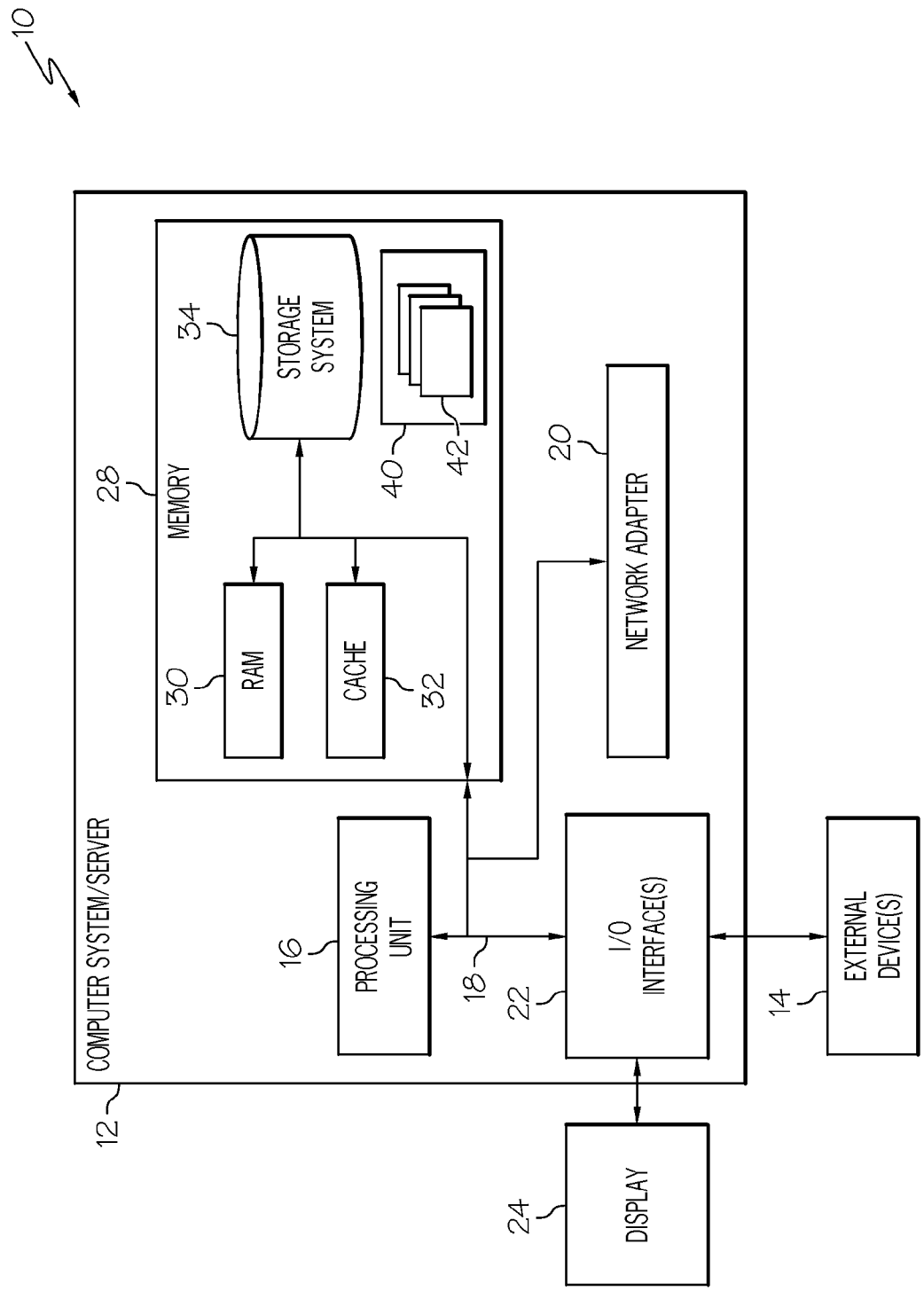
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for mapping requirements (e.g., functional and/or non-functional requirements) to components and/or policies of a system topology in a networked computing environment (e.g., a cloud computing environment). In a typical embodiment, a set of functional requirements is mapped to a set of components. A set of dependencies between the set of functional requirements is the indentified so that a set of interrelationships between the set of companies may be identified. A set of non-functional requirements is them mapped to a set of policies that are then applied to the set of components. Based on the set of components, the set of interrelationships, and the set of policies, a system topology is generated. Upon implementation of the system topology, runtime metrics may be collected as feedback that is utilized for refinement of the system topology, as well as a system topology deployed in the future.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
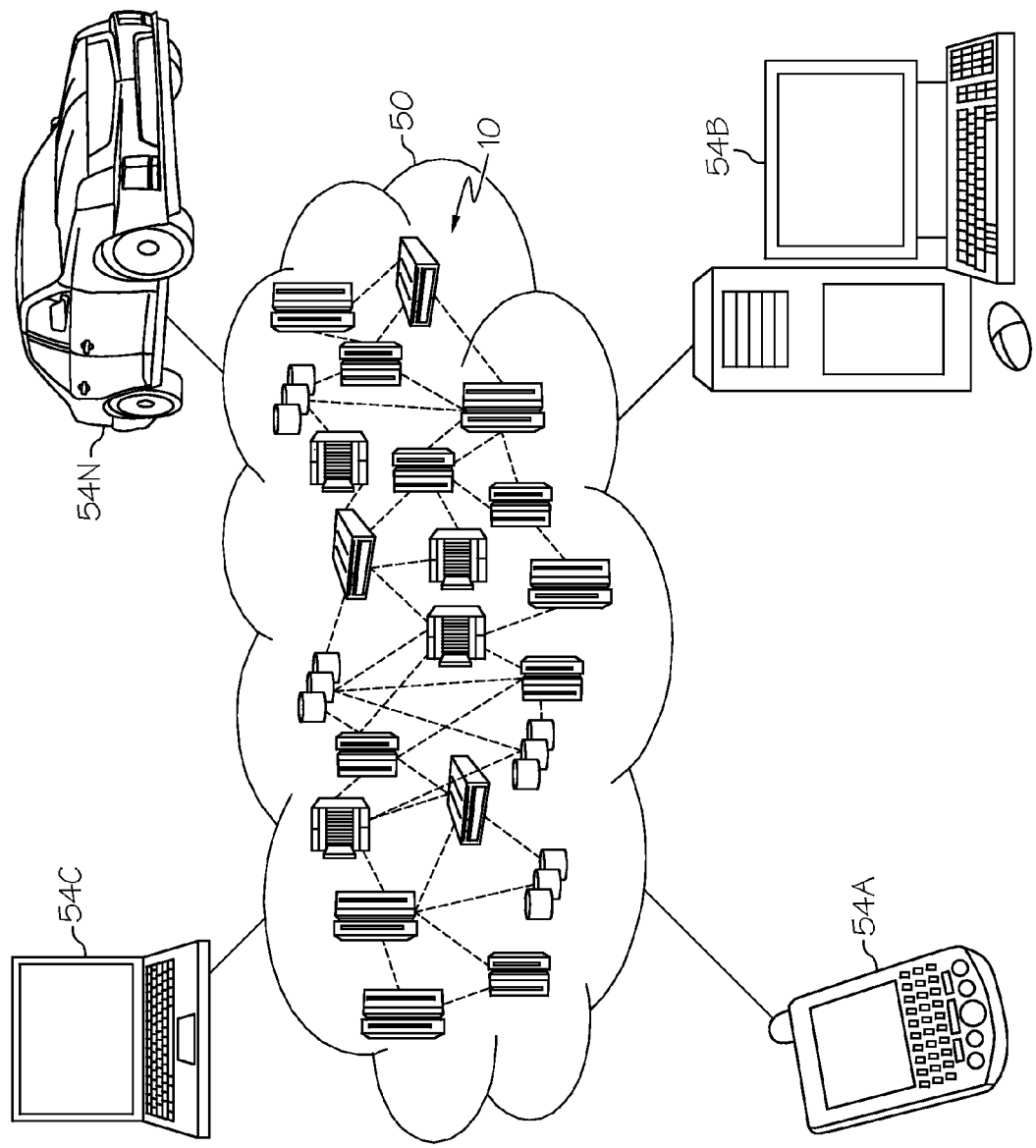
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
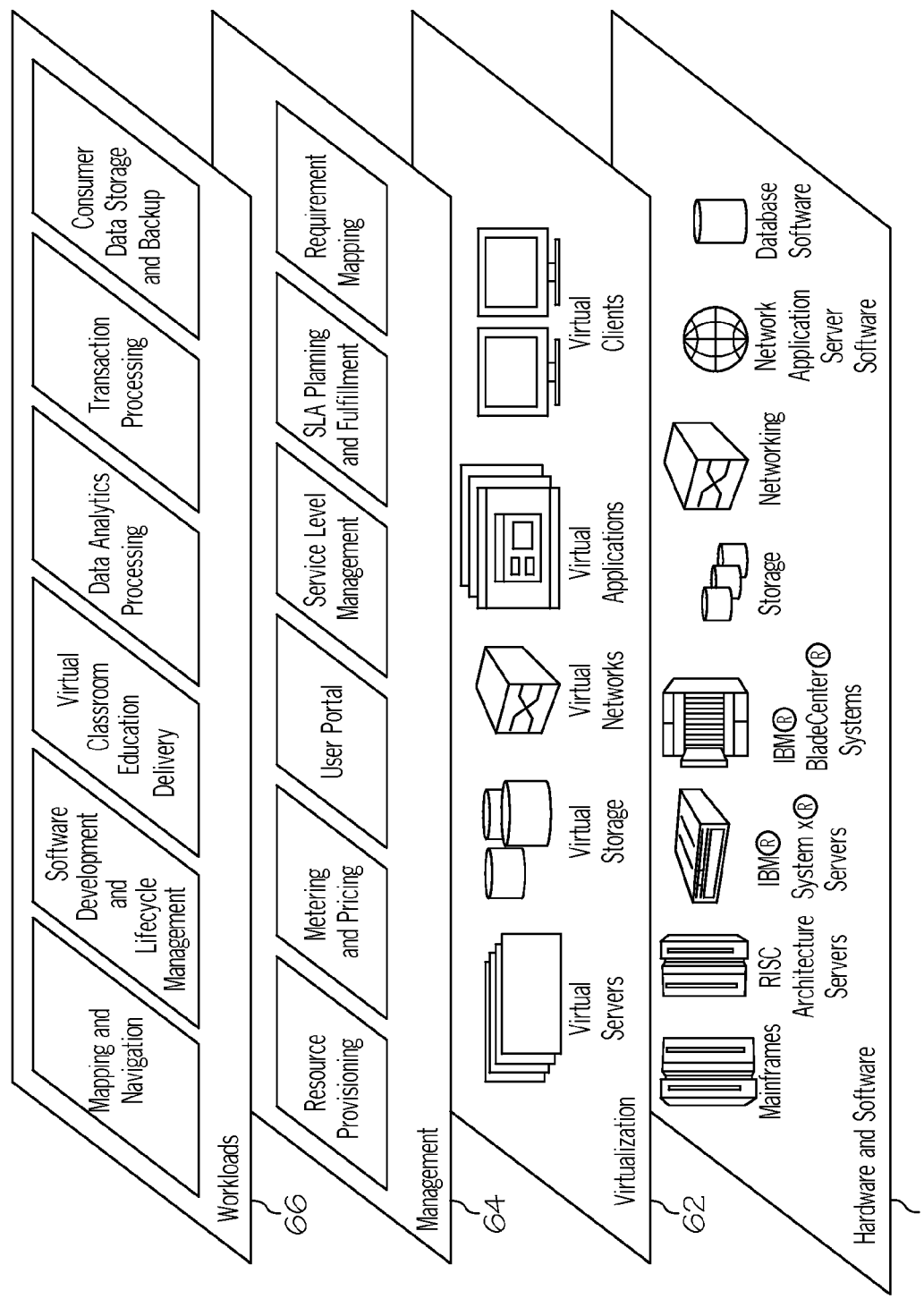
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is requirement mapping, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the requirement mapping functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
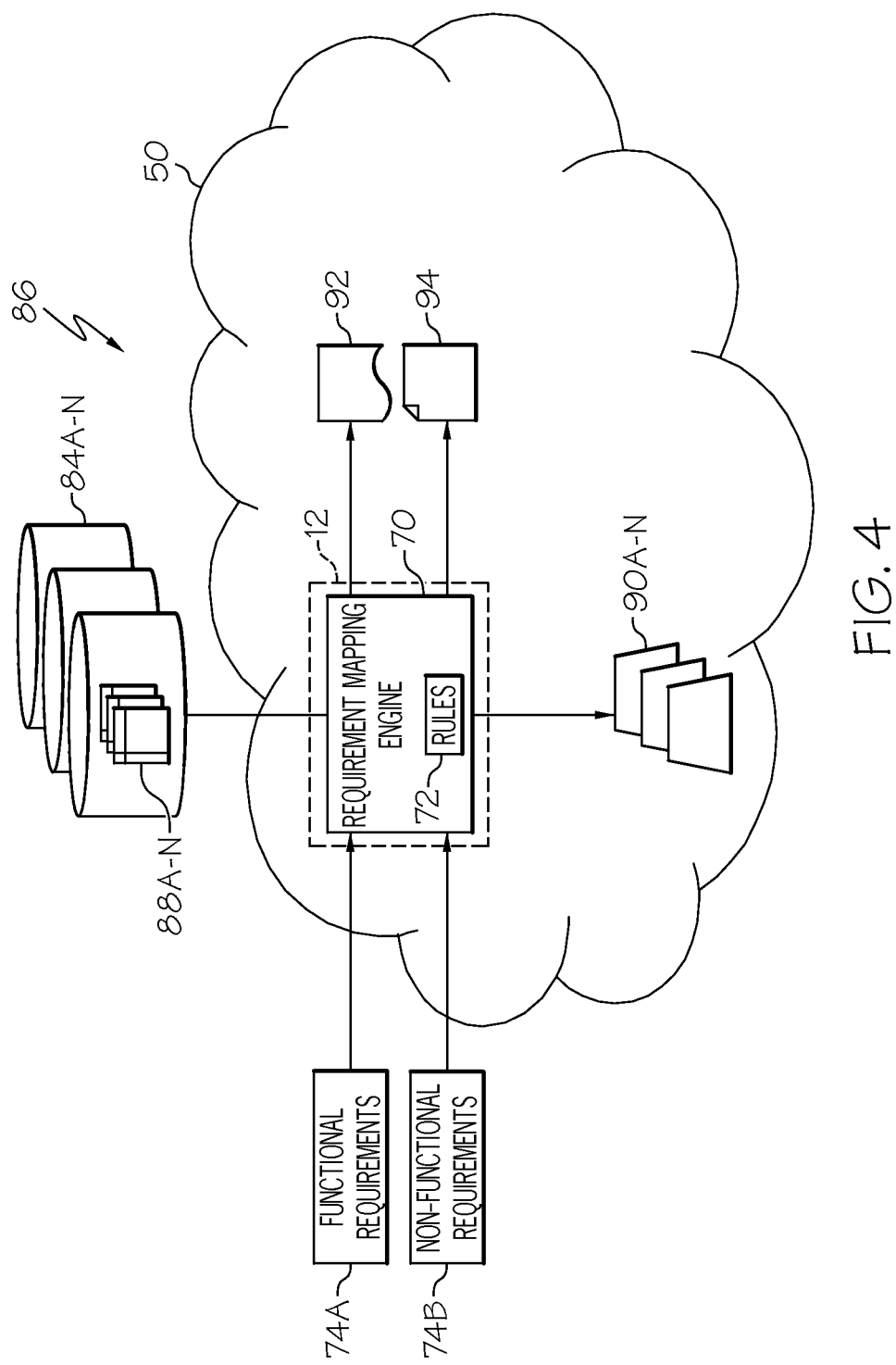
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a network computer system is shown in FIG. 4. In the event the teachings recited herein are practiced in a networked computing environment 86, each client need not have a requirement mapping engine (engine 70). Rather, engine 70 could be loaded on a server or server-capable device that communicates (e.g., wirelessly) with the clients to provide requirement mapping and system topology generation therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides requirement mapping and system topology generation hereunder.

Figure 5:
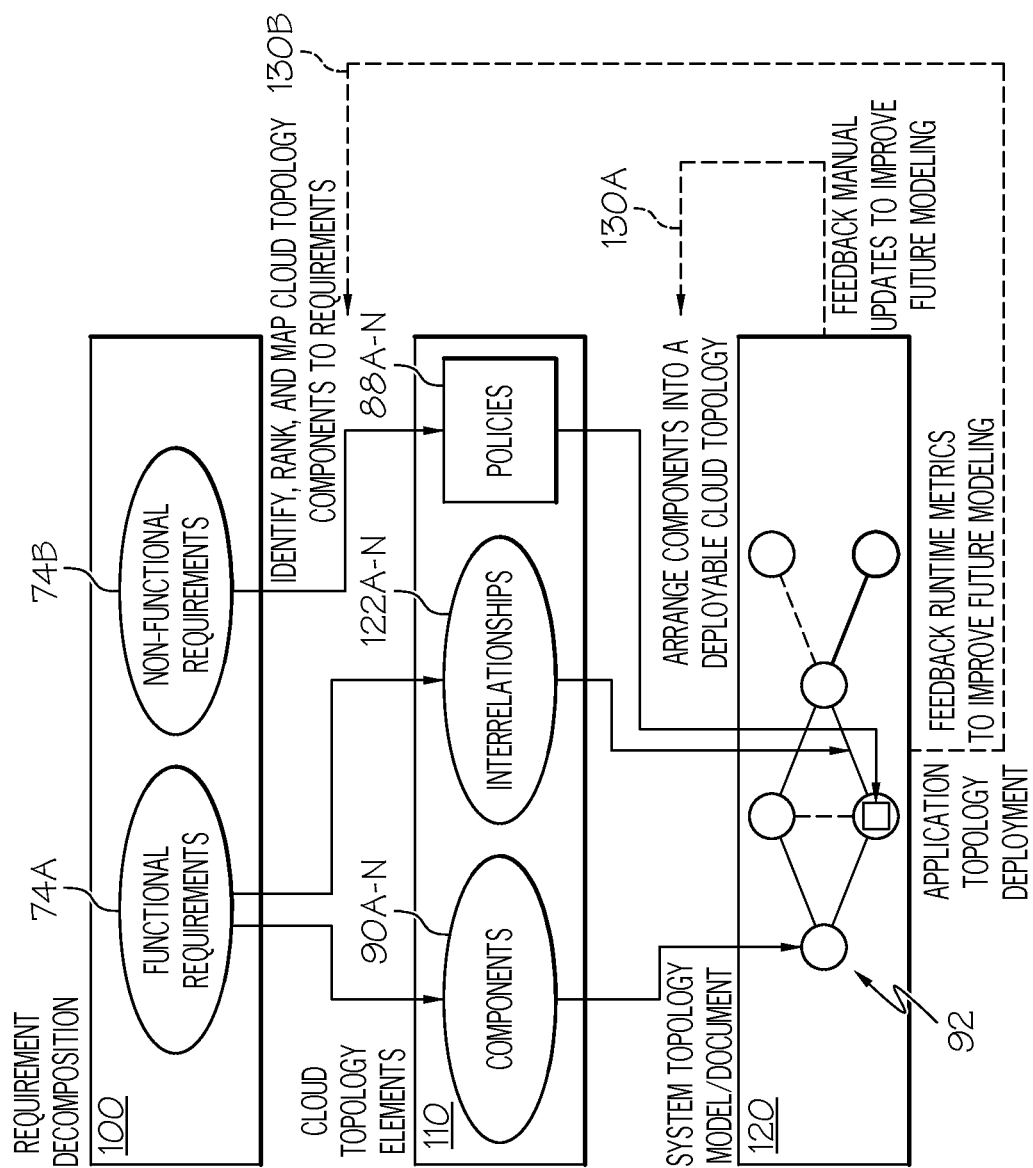
FIG. 5 depicts a process flow diagram according to an embodiment of the present invention.

Along these lines, engine 70 may perform multiple functions similar to a general-purpose computer. Specifically, among other functions, engine 70 may (among other things): map a set of functional requirements 74A to a set of components 90A-N of the networked computing environment 86; identify a set of dependencies between the set of functional requirements 74A; identify a set of interrelationships (122A-N of FIG. 5) between the set of components 90A-N based on the set of dependencies; map a set of non-functional requirements 74B to a set of policies 88A-N (e.g., stored in at least one computer memory medium 84A-N or memory 28 of FIG. 1); apply the set of policies 88A-N to the set of components 90A-N; generate system topology 92 based on the set of components 90A-N, the set of interrelationships (122A-N of FIG. 5), and the set of policies 88A-N; map the set of functional requirements 74A to a set of desired functionalities;

identify the set of components 90A-N based on a capability of the set of components 90A-N to provide the set of desired functionalities; select at least one component from the set of components 90A-N that best provides at least one desired functionality of the set of desired functionalities; maintain a prioritized list 94 of components comprising the at least one component; determine if any of the set of components 90A-N is associated any default policies; identify at least one unassociated policy that satisfies the non-functional requirements 74B; apply the default policies and the at least one unassociated policy to the set of components 90A-N; generate a diagram/model/document (120 of FIG. 5) of the system topology 92 (120 of FIG. 5); implement the system topology 92; and/or generate feedback (130A-B) of FIG. 5 based on the implementation.

Illustrative Embodiment

These details will be further described in conjunction with the process flow diagram of FIG. 5. As indicated above, requirements 100 (e.g., functional requirements 74A and non-functional requirements 74B) are mapped to various elements 110 (e.g., components 90A-N, interrelationships 122A-N, and/or policies 88A-N) in the manner shown. Each component within a cloud topology may provide multiple functionalities. For instance a Websphere® Application Server (WAS®) (WebSphere, WAS, and related terms are trademarks of International Business Machines Corporation in the United States and/or other countries) component may provide the following functionalities:

A Java Web contained
A lightweight directory access protocol (LDAP) instance

Similarly, a DB/2® component may provide a database instance (DB/2 is a trademark of International Business Machines Corporation in the United States and/or other countries). In general, interrelationships 122A-N define the dependencies between components 90A-N. For example, if a particular application needs to store data in a database, then a relationship should exist between a WAS application component and a DB/2 component that defines the instance names, credentials to access the database, etc.

For each functional requirement 74A, a topology 92 of components 90A-N is created to fulfill the functional requirements 74A. This process could be weighted for multiple aspects such as the following: lowest cost, best performance, open source solutions, least number of components, and most flexible set of components. After the components have been selected, non-functional requirements 74B will be mapped to policies 88A-N of components 90A-N. If such a configuration of components 90A-N and/or policies 88A-N is not available, different components that will fulfill the non-functional requirements 74B may be selected.

In general, the mapping of functional requirements 74A to components 90A-N and interrelationships 122A-N may be performed with the following steps:

1. Map each requirement to a functionality;
2. Determine which components provide the desired functions (either in part or in full);
   A. Select a component that best matches the desired function based on desired outcome (e.g. lowest cost, best performance, most favorable license, etc);
   B. Maintain a prioritized list of components 90A-N (since the most desired may not be selected due to dependencies);
3. Determine what requirements 100 have dependencies on other requirements 100;
   A. Augment a list of components 90A-N with meta-data reflecting the dependencies;
   B. Iterate through the list of components 90A-N and determine whether components 90A-N have the necessary relationships;
   C. Select the highest priority component (e.g., based on the best match based on the desired outcome) that has the necessary relationship; and
4. Automatically add the selected component to the topology diagram 120.

In general, mapping non-functional requirements 74B to policies 88A-N may be performed with the following steps:

1. For each non functional requirement:
   A. Determine if the selected component has a default policy with an element matching a requirement;
   B. Determine if there is an available policy that can be applied to satisfy the requirement;
2. Apply the policy to the component; and
3. If the policy is not available, log the event and continue.

In an additional embodiment, feedback 130A-B may be used to modify and/or enhance mappings. That is, a set of cloud mapping algorithms could be created using a previous history of cloud mappings. For instance, assume that a user is associated with a set of functional and non-functional requirements. The system may then create a cloud topology for the user based on these requirements. The user then has the ability to correct the suggested cloud topology prior to provisioning the environment. These modifications may then be used to enhance the mapping operations of future requests.

Another way to use prior mappings to influence future mapping operations is to allow the system to monitor its existing deployments and determine how well each deployment fulfills its non-functional requirements. Non-functional requirements are more applicable in this situation, since if a functional requirement is not met, the system may not be able to be used for its intended purpose.

Figure 6:
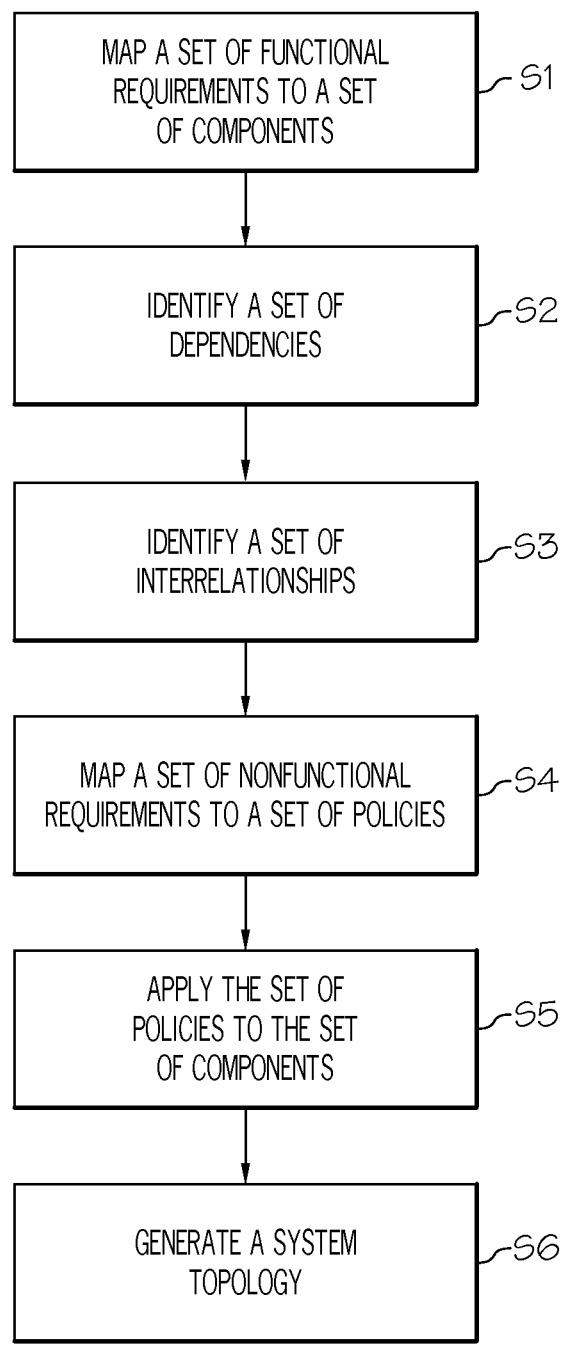
FIG. 6 depicts a method flow diagram according to an embodiment of the present invention.

Referring now to FIG. 6, a method flow diagram according to an embodiment of the present invention is shown. In step S1, a set of functional requirements is mapped to a set of components of a networked computing environment. In step S2, a set of dependencies between the set of functional requirements is identified. In step S3, a set of interrelationships between the set of components is identified based on the set of dependencies. In step S4, a set of non-functional requirements is mapped to a set of policies (e.g., as stored in at least one computer memory medium and/or computer storage device). In step S5, the set of policies is applied to the set of components. In step S6, the system topology is generated based on the set of components, the set of interrelationships, and the set of policies.

While shown and described herein as a requirement mapping and system topology generation solution, it is understood that the invention further provides various alternative embodiments. For example, in one embodiment, the invention provides a computer-readable/useable medium that includes computer program code to enable a computer infrastructure to provide requirement mapping and system topology generation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1)

and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide requirement mapping and system topology generation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for requirement mapping and system topology generation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for mapping requirements to a system topology in a networked computing environment, comprising:
   mapping a set of functional requirements to a set of components of the networked computing environment;
   identifying a set of dependencies between the set of functional requirements;
   identifying a set of interrelationships between the set of components based on the set of dependencies;
   mapping a set of non-functional requirements to a set of policies, the set of policies being stored in at least one computer memory medium;
   applying the set of policies to the set of components; and
   generating the system topology based on the set of components, the set of interrelationships, and the set of policies.

2. The computer-implemented method of claim 1, the mapping of the set of functional requirements to the set of components, comprising:
   mapping the set of functional requirements to a set of desired functionalities; and
   identifying the set of components based on a capability of the set of components to provide the set of desired functionalities.

3. The computer-implemented method of claim 2, further comprising:
   selecting at least one component from the set of components that best provides at least one desired functionality of the set of desired functionalities; and
   maintaining a prioritized list of components comprising the at least one component.

4. The computer-implemented method of claim 1, the mapping of the set of non-functional requirements, comprising:
   determining if any of the set of components is associated with any default policies;
   identifying at least one unassociated policy that satisfies the non-functional requirements; and
   applying the default policies and the at least one unassociated policy to the set of components.

5. The computer-implemented method of claim 1, further comprising generating a diagram of the system topology.

6. The computer-implemented method of claim 1, further comprising:
   deploying the system topology; and
   generating feedback based on the implementing.

7. The computer-implemented method of claim 1, the networked computing environment comprising a cloud computing environment, and the system topology comprising a cloud topology.

8. A system for mapping requirements to a system topology in a networked computing environment, comprising:
   a memory medium comprising instructions;
   a bus coupled to the memory medium; and
   a processor coupled to the bus that when executing the instructions causes the system to:
      map a set of functional requirements to a set of components of the networked computing environment;
      identify a set of dependencies between the set of functional requirements;
      identify a set of interrelationships between the set of components based on the set of dependencies;

map a set of non-functional requirements to a set of policies, the set of policies being stored in at least one computer memory medium;
apply the set of policies to the set of components; and
generate the system topology based on the set of components, the set of interrelationships, and the set of policies.

9. The system of claim 8, the memory medium further comprising instructions for causing the system to:
map the set of functional requirements to a set of desired functionalities; and
identify the set of components based on a capability of the set of components to provide the set of desired functionalities.

10. The system of claim 9, the memory medium further comprising instructions for causing the system to:
select at least one component from the set of components that best provides at least one desired functionality of the set of desired functionalities; and
maintain a prioritized list of components comprising the at least one component.

11. The system of claim 8, the memory medium further comprising instructions for causing the system to:
determine if any of the set of components is associated with any default policies;
identify at least one unassociated policy that satisfies the non-functional requirements; and
apply the default policies and the at least one unassociated policy to the set of components.

12. The system of claim 8, the memory medium further comprising instructions for causing the system to generate a diagram of the system topology.

13. The system of claim 8, the memory medium further comprising instructions for causing the system to:
deploy the system topology; and
generate feedback based on the implementation.

14. The system of claim 8, the networked computing environment comprising a cloud computing environment, and the system topology comprising a cloud topology.

15. A computer program product for mapping requirements to a system topology in a networked computing environment, the computer program product comprising a computer readable storage device, and program instructions stored on the computer readable storage device, to:
map a set of functional requirements to a set of components of the networked computing environment;
identify a set of dependencies between the set of functional requirements;
identify a set of interrelationships between the set of components based on the set of dependencies;
map a set of non-functional requirements to a set of policies, the set of policies being stored in at least one computer memory medium;
apply the set of policies to the set of components; and
generate the system topology based on the set of components, the set of interrelationships, and the set of policies.

16. The computer program product of claim 15, the computer readable storage device further comprising instructions to:
map the set of functional requirements to a set of desired functionalities; and
identify the set of components based on a capability of the set of components to provide the set of desired functionalities.

17. The computer program product of claim 16, the computer readable storage device further comprising instructions to:
select at least one component from the set of components that best provides at least one desired functionality of the set of desired functionalities; and
maintain a prioritized list of components comprising the at least one component.

18. The computer program product of claim 15, the computer readable storage device further comprising instructions to:
determine if any of the set of components is associated with any default policies;
identify at least one unassociated policy that satisfies the non-functional requirements; and
apply the default policies and the at least one unassociated policy to the set of components.

19. The computer program product of claim 15, the computer readable storage device further comprising instructions to generate a diagram of the system topology.

20. The computer program product of claim 15, the computer readable storage device further comprising instructions to:
deploy the system topology; and
generate feedback based on the implementation.

21. The computer program product of claim 15, the networked computing environment comprising a cloud computing environment, and the system topology comprising a cloud topology.

22. A method for deploying a system for mapping requirements to a system topology in a networked computing environment, comprising:
providing a computer infrastructure being operable to:
map a set of functional requirements to a set of components of the networked computing environment;
identify a set of dependencies between the set of functional requirements;
identify a set of interrelationships between the set of components based on the set of dependencies;
map a set of non-functional requirements to a set of policies, the set of policies being stored in at least one computer memory medium;
apply the set of policies to the set of components; and
generate the system topology based on the set of components, the set of interrelationships, and the set of policies.

* * * * *